(12) United States Patent
Okamoto

(10) Patent No.: US 8,154,622 B2
(45) Date of Patent: Apr. 10, 2012

(54) CONTENT RECORDING APPARATUS IN WHICH ATTRIBUTE INFORMATION IS SUPPRESSED ACCORDING TO OPERATION MODE

(75) Inventor: Masayoshi Okamoto, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 939 days.

(21) Appl. No.: 11/919,878

(22) PCT Filed: May 1, 2006

(86) PCT No.: PCT/JP2006/309441
§ 371 (c)(1),
(2), (4) Date: Nov. 1, 2007

(87) PCT Pub. No.: WO2006/121092
PCT Pub. Date: Nov. 16, 2006

(65) Prior Publication Data
US 2009/0091624 A1 Apr. 9, 2009

(30) Foreign Application Priority Data
May 11, 2005 (JP) ................................. 2005-138838

(51) Int. Cl.
*H04N 5/76* (2006.01)
(52) U.S. Cl. .................................. 348/231.3; 348/207.1
(58) Field of Classification Search ............ 348/207.11, 348/207.1, 222.1, 231.9, 231.3, 231.2
See application file for complete search history.

(56) References Cited

U.S. PATENT DOCUMENTS

| | | | | |
|---|---|---|---|---|
| 7,535,490 B2 * | 5/2009 | Aizawa | .................... | 348/207.11 |
| 2004/0090543 A1 * | 5/2004 | Suehiro | .................... | 348/231.99 |
| 2004/0109062 A1 * | 6/2004 | Yamaya | .................... | 348/207.1 |
| 2004/0189809 A1 * | 9/2004 | Choi | ........................ | 348/207.1 |
| 2004/0189810 A1 * | 9/2004 | Aizawa | .................... | 348/207.1 |
| 2005/0012828 A1 * | 1/2005 | Oka | ......................... | 348/231.2 |
| 2005/0134689 A1 * | 6/2005 | Hatanaka | .................. | 348/207.1 |
| 2005/0140789 A1 * | 6/2005 | Yasuda | .................... | 348/207.2 |
| 2007/0260809 A1 * | 11/2007 | Hara et al. | ................ | 711/101 |

FOREIGN PATENT DOCUMENTS

| | | | |
|---|---|---|---|
| CN | 1499386 | | 5/2004 |
| JP | 2002271721 A | * | 9/2002 |
| JP | 2003-283901 | | 10/2003 |
| JP | 2004-297171 | | 10/2004 |
| JP | 2005-276016 | | 10/2005 |
| JP | 2005276016 A | * | 10/2005 |
| JP | 2006-086862 | | 3/2006 |

* cited by examiner

Primary Examiner — Jason Chan
Assistant Examiner — Gary C Vieaux
(74) Attorney, Agent, or Firm — Gerald T. Bodner

(57) ABSTRACT

A content recording apparatus (10) includes an image sensor (12). When a shutter operation is performed, an image imaged by the image sensor is captured in an SDRAM (26), and the captured image is recorded in a memory card (28). The recorded image is transmitted to a recorder (40) being host equipment through a USB controller (30) when a USB transfer mode is selected, and an imaging transfer mode as a subordinate mode is turned off. That is, the CPU prohibits a capturing operation, and registers all the attribute information of the recorded image in a management table (26t), and the recorder performs an image acquiring operation referring to the management table. When the imaging transfer mode is turned on, the CPU skips registration of all the attribute information to allow a capturing operation. When the image is captured, the CPU registers only the attribute information of the image in the management table and sends an image acquiring request to the recorder.

7 Claims, 8 Drawing Sheets

26t

| HANDLE NUMBER | OBJECT IDENTIFIER |
|---|---|
| 0x10000000 | DCIM |
| 0x10010000 | DCIM¥100SANYO |
| 0x10010001 | DCIM¥100SANYO¥SANYO001. jpg |
| 0x10010002 | DCIM¥100SANYO¥SANYO002. jpg |
| ⋮ | ⋮ |
| 0x1015001E | DCIM¥121SANYO¥SANYO030. jpg |

26t

| HANDLE NUMBER | OBJECT IDENTIFIER |
|---|---|
| - | - |

26t

| HANDLE NUMBER | OBJECT IDENTIFIER |
|---|---|
| 0x10000000 | DCIM |
| 0x10010000 | DCIM¥100SANYO |
| 0x10010001 | DCIM¥100SANYO¥SANYO001.jpg |
| 0x10010002 | DCIM¥100SANYO¥SANYO002.jpg |
| ⋮ | ⋮ |
| 0x1015001E | DCIM¥121SANYO¥SANYO030.jpg |

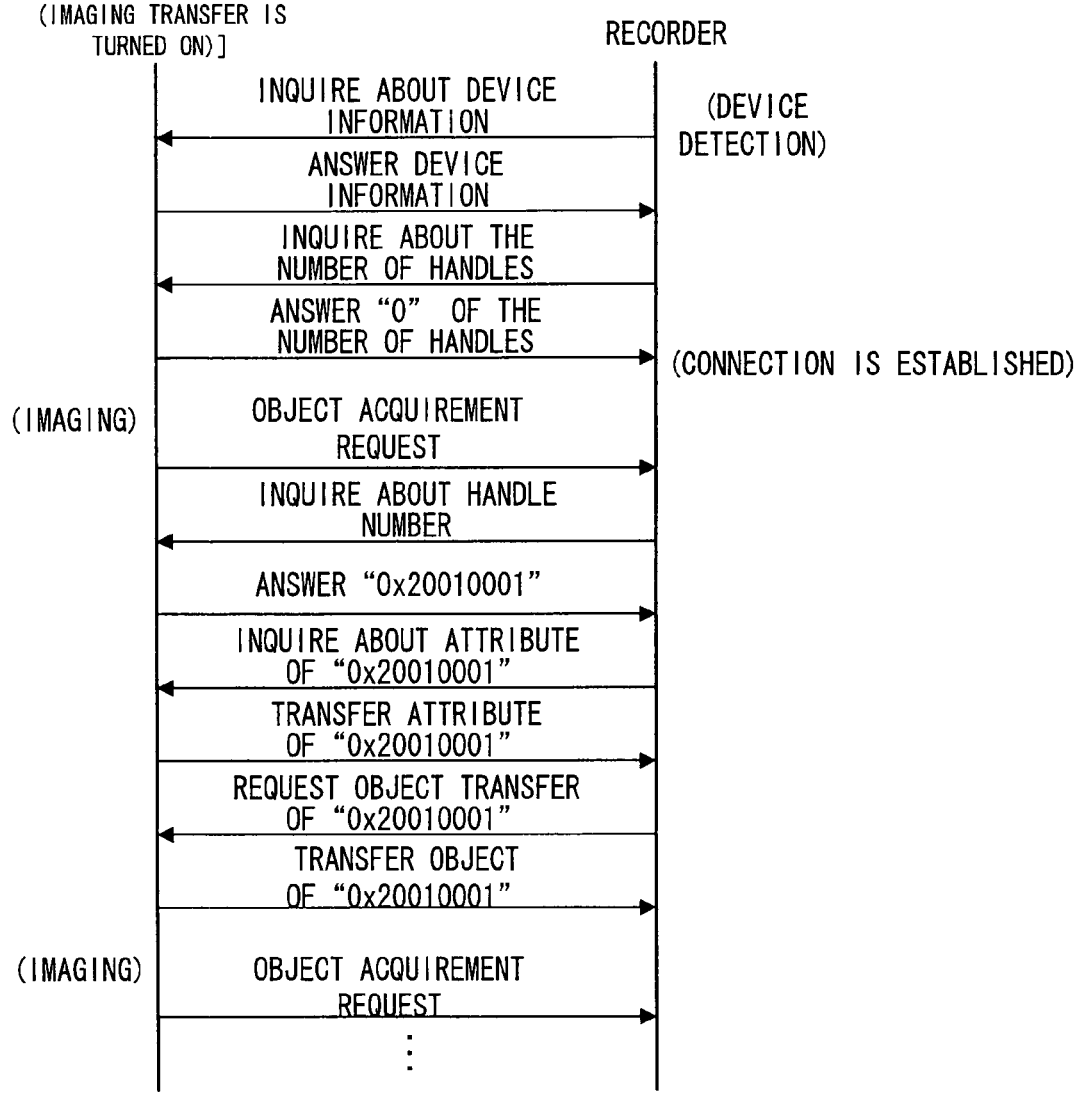

CONTENT RECORDING APPARATUS IN WHICH ATTRIBUTE INFORMATION IS SUPPRESSED ACCORDING TO OPERATION MODE

TECHNICAL FIELD

The present invention relates to a content recording apparatus. More specifically, the present invention relates to a content recording apparatus utilized in a digital camera and capable of capturing a content, recording the captured content in a recording medium, and transferring the recorded content to host equipment such as a printer, a recorder, etc.

PRIOR ART

The Japanese Patent Application Laid-Open No. 2003-283901 laid-open on Oct. 3, 2003 has been known as an example of such a kind of conventional apparatus. The prior art captures an image through a CCD, records the captured image in an external memory, and transfers the recorded image to a personal computer by utilizing a USB system.

With respect to transfer processing, before transferring an image in a certain file, a thumbnail corresponding to the image is transferred. If there is a stop instruction from host equipment in response thereto, transferring the image is cancelled. Such confirmation processing is repetitively performed on all the files in the recording medium. By thus cancelling transfer of an unnecessary image, it is possible to reduce the amount of transferred data.

However, in the prior art, even in a case that there is the only one file having an image to be transferred, confirmation processing is performed by the number the same as the number of files in the recording medium, and therefore, especially, in a case that there are a lot of files, it takes a long time for transfer processing, and a capturing operation cannot be performed until the transfer processing is completed.

SUMMARY OF THE INVENTION

Therefore, it is a primary object of the present invention to provide a novel content recording apparatus.

Another object of the present invention is to provide a content recording apparatus allowing a quick capturing operation.

A content recording apparatus (10) according to claim 1 comprises a capturer (12, 14) for capturing a content, a recorder (S77, 26) for recording the content captured by the capturer in a recording medium (28), a management table (26*t*) for holding attribute information of the content recorded in the recording medium, a connector (30) for connecting with a host device (40) performing a content acquiring operation on the basis of the management table, a selector (S9, S11) for selecting any one of a first mode allowing a capturing operation by the capturer in a state that a connection by the connector is established and a second mode prohibiting the capturer from performing a capturing operation in a state that a connection by the connector is established, a suppresser (S41, S45, S47) for suppressing an information amount of the attribute information held by the management table when the first mode is selected in comparison with an information amount of the attribute information held in the management table when the second mode is selected, and a describer (S51) for describing the attribute information of the content captured by the capturer in the first mode in the management table.

A content is captured by a capturer, and recorded in a recording medium by a recorder. Attribute information of the content recorded in the recording medium is held in a management table. A host device connected by a connector performs a content acquiring operation with reference to the management table.

A first mode is a mode allowing a capturing operation by the capturer in a state that a connection by the connector is established, and a second mode is a mode prohibiting the capturer from performing a capturing operation in a state that a connection by the connector is established. A selector selects any one of the first mode and the second mode.

A suppresser suppresses an information amount of the attribute information held by the management table when the first mode is selected in comparison with an information amount of the attribute information held in the management table when the second mode is selected. Furthermore, a describer describes the attribute information of the content captured by the capturer in the first mode in the management table.

The information amount of the attribute information held in the management table is suppressed when the first mode is selected, and whereby, it is possible to allow a quick capturing operation by the capturer. In addition, the attribute information of the content captured in the first mode is described in the management table by the describer, and whereby, it is possible for the host device to perform an acquiring operation of the content.

A content recording apparatus according to claim 2 is dependent on claim 1, and further comprises a transmitter (S95) for transmitting a content acquiring request to the host device in association with a describing operation by the describer.

A content acquiring request is transmitted in association with the describing operation by the describer. This makes it possible to cause the host device to perform an acquiring operation of the content captured in the first mode.

A content recording apparatus according to claim 3 is dependent on claim 1, and further comprises a determiner (S53) for determining whether or not a content acquiring operation is performed on the content captured by the capturer in the first mode, and an erasure (S55) for erasing the attribute information described by the describer from the management table when a determination result by the determiner is affirmative.

The attribute information described by the describer is erased from the management table after a content acquiring operation is performed on the content captured by the capturer in the first mode.

Every time that a content acquiring operation is performed, the attribute information is erased, and therefore, it is possible to avoiding making an execution interval of the capturing operation long due to accumulation of the attribute information by repetitive performances of the capturing operation.

A content recording apparatus according to claim 4 is dependent on claim 1, and the capturer includes an image sensor (12), the content includes image data corresponding to an object scene image imaged by the image sensor, and the connector performs a PTP connection (Picture Transfer Protocol).

A capture control program according to the invention in claim 5 causes a processor (18) of a content recording apparatus (10) having a capturer (12, 14) for capturing a content, a recorder (26) for recording the content captured by the capturer in a recording medium (28), a management table (26*t*) for holding attribute information of the content recorded in the recording medium, a connector (30) for connecting with a host device (40) performing a content acquiring operation on the basis of the management table to execute: a selecting step (S9, S11) for selecting any one of a first mode allowing a capturing operation by the capturer in a state that a connection by the connector is established and a second mode prohibiting the capturer from performing a capturing operation in a state that a connection by the connector is established; a suppressing step (S41, S45, S47) for suppressing an information amount of the attribute information held by the management table when the first mode is selected in comparison with an information amount of the attribute information held in the management table when the second mode is selected; and a describing step (S51) for describing the attribute information of the content captured by the capturer in the first mode in the management table.

A recording medium according to the invention in claim 6 is a recording medium recording the capture control program described above.

A capture controlling method according to the invention in claim 7 is a capture controlling method executed by a content recording apparatus (10) having a capturer (12, 14) for capturing a content, a recorder (26) for recording the content captured by the capturer in a recording medium (28), a management table (26t) for holding attribute information of the content recorded in the recording medium, a connector (30) for connecting with a host device (40) performing a content acquiring operation on the basis of the management table, comprises: a selecting step (S9, S11) for selecting any one of a first mode allowing a capturing operation by the capturer in a state that a connection by the connector is established and a second mode prohibiting the capturer from performing a capturing operation in a state that a connection by the connector is established; a suppressing step (S41, S45, S47) for suppressing an information amount of the attribute information held by the management table when the first mode is selected in comparison with an information amount of the attribute information held in the management table when the second mode is selected; and a describing step (S51) for describing the attribute information of the content captured by the capturer in the first mode in the management table.

According to the present invention, it is possible to allow a quick capturing operation. Furthermore the host equipment can perform an acquiring operation as to the captured content.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustrative view showing one example of a communication protocol applied to FIG. 1 embodiment when an imaging transfer is turned on;

FIG. 8(A) is an illustrative view showing an example of registration of the table in FIG. 4 in a state that an imaging transfer is turned on;

FIG. 8(B) is an illustrative view showing another example of registration of the table in FIG. 4 in a state that an imaging transfer is turned on;

BEST MODE FOR PRACTICING THE INVENTION

Figure 1:
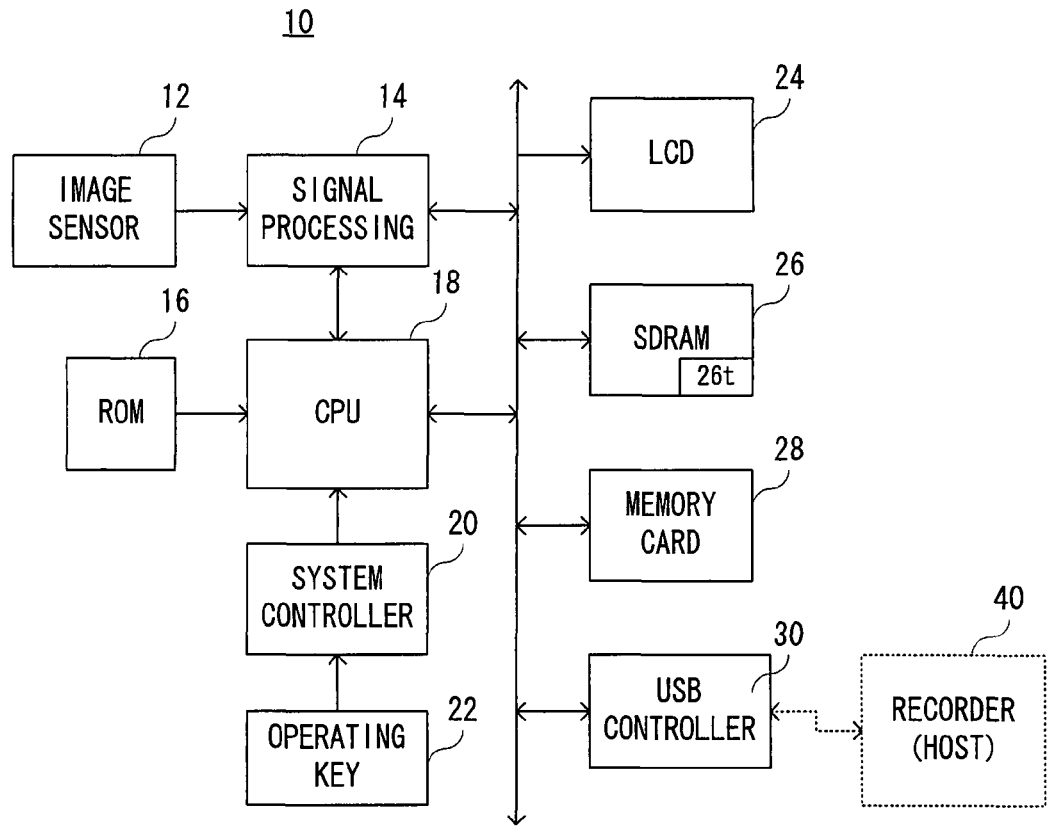
FIG. 1 is a block diagram showing a configuration of an embodiment of the present invention.

Referring to FIG. 1, a digital camera (hereinafter to be referred as "camera") 10 of this embodiment includes an image sensor 12. An optical image of an object scene is irradiated onto an imaging surface of the image sensor 12 through a focus lens not shown. On the imaging surface, electric charges, that is, a raw image signal corresponding to the optical image of the object is generated by photoelectronic conversion.

When a real-time motion image, that is, a through-image of the object is displayed on an LCD monitor 24, a low-resolution raw image signal corresponding to the optical image of the object is output from the image sensor 12. A signal processing circuit 14 converts the output raw image signal into raw image data being a digital signal, converts the converted raw image data into image data in YUV format, and writes the converted image data in the SDRAM 26.

The image data written in the SDRAM 26 is read by the same signal processing circuit 14. The signal processing circuit 14 converts the read image data into a composite video signal in an NTSC format, and applies the converted composite video signal to the LCD monitor 24. Thus, a through-image of the object is displayed on the monitor screen.

When a shutter operation is performed through an operation key 22 in a state that a through-image of the desired object is displayed on the monitor screen, a primary exposure is performed by the image sensor 12, and all the electric charges thus generated, that is, a raw image signal is output from the image sensor 12. The signal processing circuit 14 converts the output raw image signal into raw image data, converts the raw image data into image data in YUV format, and writes the image data in the SDRAM 26. After completion of writing, the CPU 18 reads the image data from the SDRAM 26, and records an image file including the read image data in a memory card 28.

Figure 2:
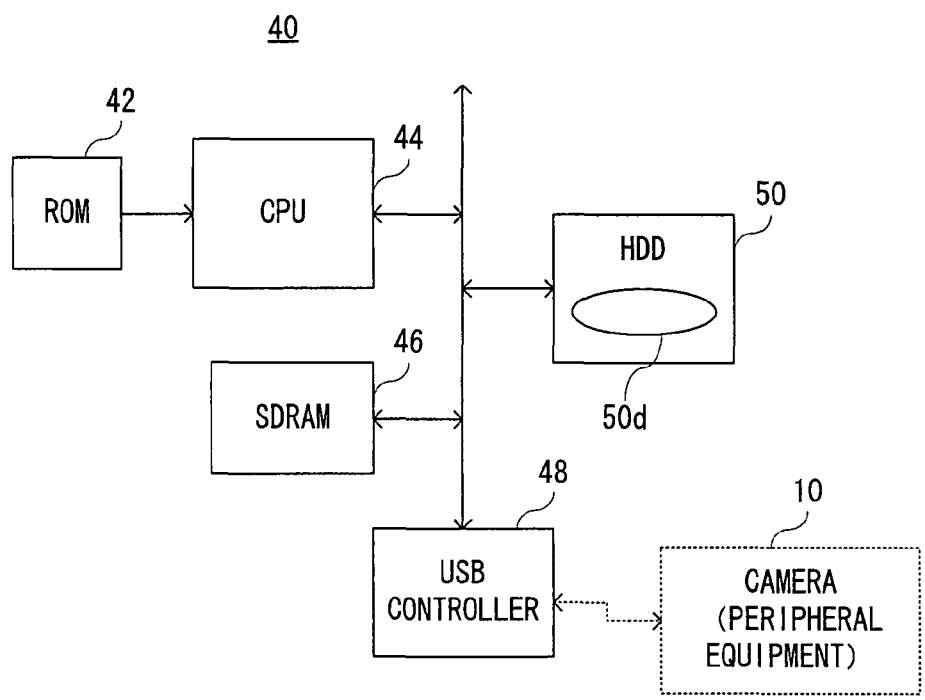
FIG. 2 is a block diagram showing an example of a configuration of host equipment connected with FIG. 1 embodiment.

When such imaging/recording process is repeatedly performed, a plurality of image files are accumulated in the memory card 28. The accumulated image files are transferred to a hard disk recorder (hereinafter referred to as "recorder") 40 in the USB system. That is, the camera 10 further includes a USB controller 30. The USB controller 30 is connected to a USB controller 48 (see FIG. 2) on the side of the recorder 40. The USB controller 30 does not have a USB host function while the USB controller 48 has this function. That is, the camera 10 operates as a peripheral device of the recorder 40 being host equipment.

Generally, the USB transfer has a directional character, and host equipment can send data to peripheral devices at a desired timing while the peripheral devices can only send data as a response to a request from the host equipment. Thus, the PTP (Picture Transfer Protocol) is applied to the transfer between the camera 10 and the recorder 40.

According to the PTP, the recorder 40 periodically sends a request signal to the camera 10. In response to the request signal, the camera 10 sends back "there being a command" in the presence of a command. When receiving "there being a command", the recorder 40 sends a command request, and periodically sends a request signal again. After preparation for sending a command, the camera 10 sends back a command in response to the request signal. When receiving the command, the recorder 40 executes processing according to the command, and sends an execution result to the camera 10. This makes it possible to control the recorder 40 by an operation on the side of the camera 10 by utilizing a USB system.

Figures 3, 4, 5:
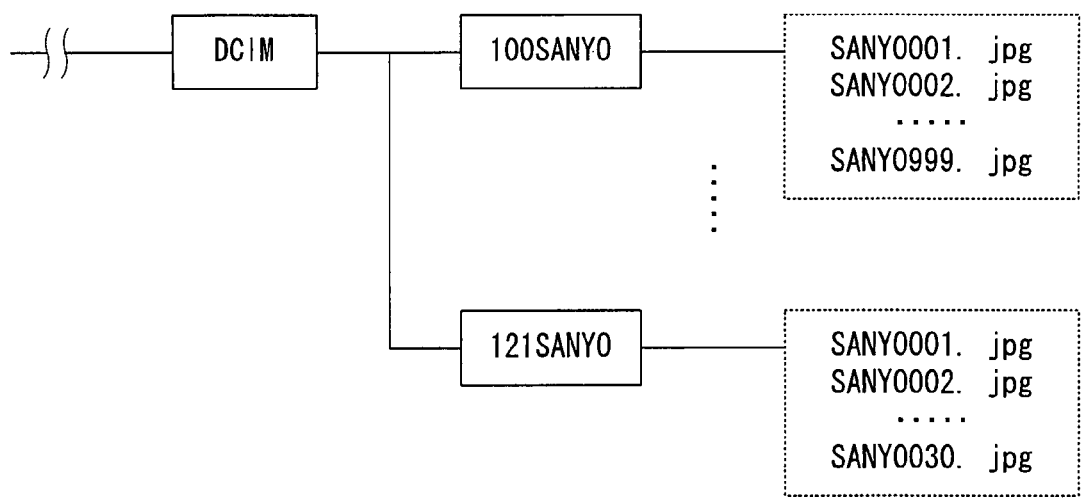
FIG. 3 is an illustrative view showing one example of a directory tree applied to FIG. 1 embodiment.
FIG. 4 is an illustrative view showing an example of a configuration of a table applied to FIG. 1 embodiment.
FIG. 5 is an illustrative view showing an example of registration of the table in FIG. 4 in a state that an imaging transfer is turned off.

The transfer processing performed between the camera 10 and the recorder 40 constructed described above is explained in detail. In the camera 10, a plurality of image files within the memory card 28 are managed by a directory tree shown in FIG. 3. With reference to FIG. 3, a root directory "DCIM" includes 22 subdirectories "100SANYO"-"121SANYO". Each of these 22 subdirectories stores one or a plurality of image files. For example, the subdirectory "100SANYO" includes 999 image files "SANY0001"-"SANY0999", and the subdirectory "121SANYO" includes 30 image files "SANY0001"-"SANY0030".

When a USB transfer mode is selected through the operation key 22, a table 26t shown in FIG. 4 is generated in the SDRAM 26. In the table 26t, a handle number and an object identifier are registered. Furthermore, the USB transfer mode includes an "imaging transfer mode" as a subordinate mode. Thus, after selection of the USB transfer mode, a turning on or off operation of the imaging transfer mode is accepted through the operation key 22.

When the imaging transfer mode is turned off, a handle number is applied to each of the directories and each of the image files (hereinafter referred to as "object") constructing the tree shown in FIG. 3. For example, a handle number "0x10000000" is applied to the object "DCIM", a handle number "0x10010000" is applied to the object "DCIM¥SANYO", and a handle number "0x10010001" is applied to the object "¥DCIM121SANYO¥SANY0001.jpg".

The applied handle numbers "0x100000000", "0x10010000", "0x100100001" . . . are registered in the table 26t together with respectively corresponding object identifiers "DCIM", "DCIM¥100SANYO", "DCIM¥100SANYO¥SANY0001.jpg", . . . in a manner shown in FIG. 5.

Figure 6:
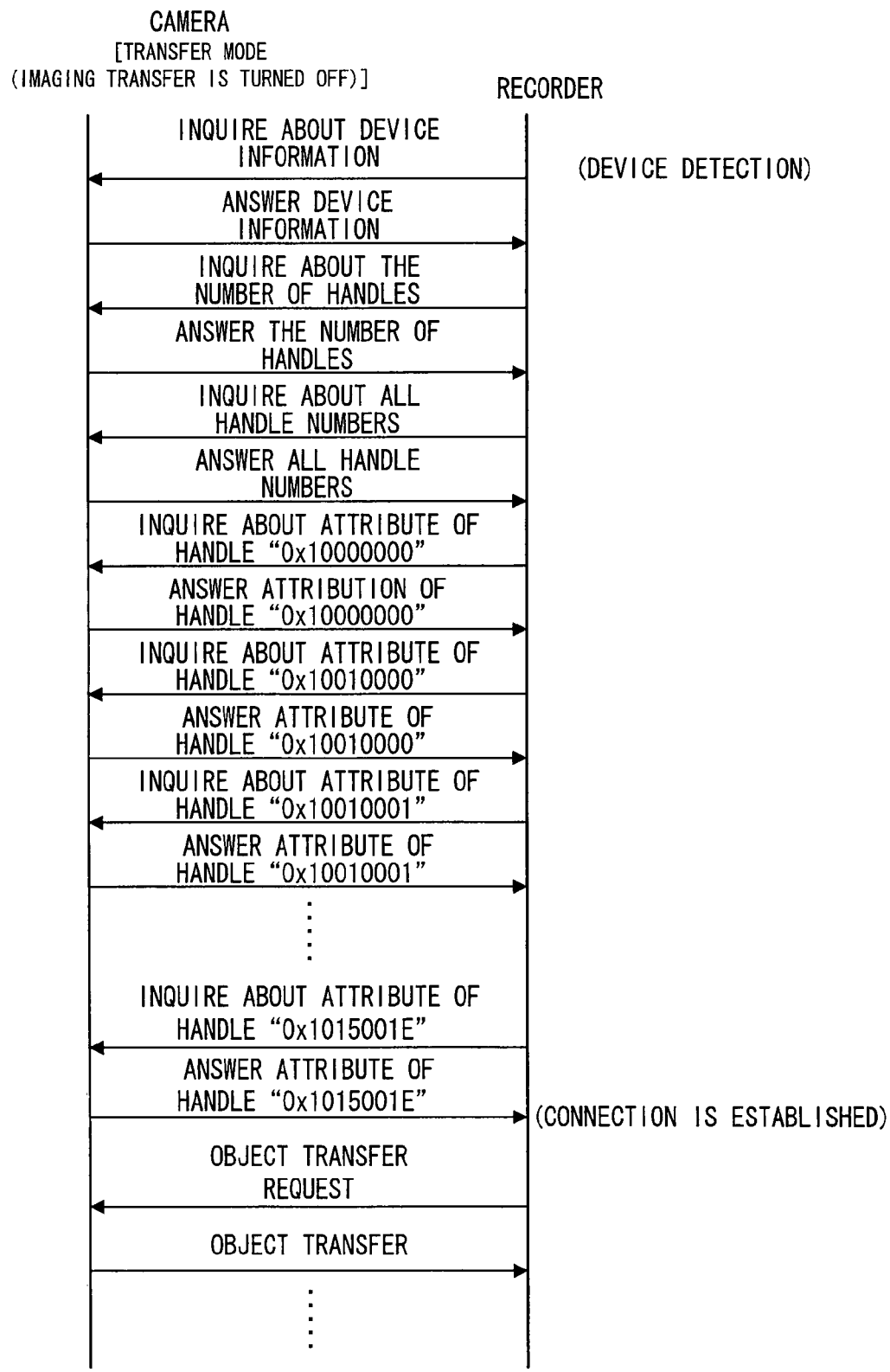
FIG. 6 is an illustrative view showing a transfer protocol applied to FIG. 1 embodiment when an imaging transfer is turned off.

The handle numbers and identifiers thus registered are transferred to the recorder 40 in a manner shown in FIG. 6. With reference to FIG. 6, the recorder 40 inquires of the camera 10 about device information after detecting a device by the USB controller 48. The camera 10 answers device information, such as model information, model number information, etc. Next, the recorder 40 inquires about the number of handles. The camera 10 answers the number of handles registered in the table 26t.

Next, the recorder 40 inquires about a handle number. The camera 10 answers all the handle numbers "0x10000000", . . . , "0x1015001E" registered in the table 26t. Next, the recorder 40 inquires about attribute information of the object corresponding to the handle number "0x10000000". With reference to the table 26t, the camera 10 answers the object identifier "DCIM" corresponding to the handle number "0x10000000".

The inquiry of the attribute information is repeated by the number the same as the number of handles answered by the camera 10. After completion of transferring an object identifier "DCIM¥121SANYO¥SANY0030.jpg" corresponding to the last handle number "0x1015001E", the PTP connection is established to thereby transmit an arbitrary object to the recorder 40 in response to an operation on the side of the camera 10 from that time. It should be noted that in FIG. 6, a request signal from the recorder 40 to the camera 10 is omitted (the same is true for FIG. 7).

On the other hand, when the imaging transfer mode is turned on, processing of previously registering all the handle numbers and all the object identifiers in the table 26t like above description is skipped. The imaging transfer processing is performed in a manner shown in FIG. 7. With reference to FIG. 7, in response to the inquiry about the number of handles, "0" is answered, and succeeding inquiring and answering the handle number and inquiring and answering the attribute information are entirely omitted. That is, the PTP connection is established at a time when "0" of the number of handles is transferred.

The camera 10 accepts a shutter operation after the PTP connection is thus established, executes imaging and recording processing, applies a handle number, for example, "0x20010001" to the image file thus generated, and registers the handle number and the object identifier, for example, "MEM¥100SANYO¥SANY1001.jpg" in the table 26t (see FIG. 8(A)).

After completion of registering the handle number and the object identifier, the camera 10 sends an object acquirement request to the recorder 40. It should be noted that the object acquirement request is sent as a response to the request signal from the recorder 40. The recorder 40 which receives the object acquirement request inquires about a handle number. The camera 10 answers the handle number "0x20010001" registered in the table 26t. Next, the recorder 40 inquires about attribute information of the object corresponding to the handle number "0x20010001". The camera 10 answers an object identifier "MEM¥100 SANYO¥SANY1001.jpg" corresponding to the handle number "0x20010001" as attribute information with reference to the table 26t.

Next, the recorder 40 requests transfer of the object corresponding to the handle number "0x20010001". The camera 10 answers the object corresponding to the handle number "0x20010001", that is, the image file "SANY1001.jpg", and erases the handle number "0x20010001" and the object identifier "MEM¥100SANYO¥SANY1001.jpg" from the table 26t (see FIG. 8(B)).

In this manner, in the imaging transfer mode, every imaging, a handle number and an identifier of a new object are registered in the table 26t, and after the new object is transferred on the basis of the table 26t, the handle number and the identifier of the new object are erased from the table 26t.

Figure 9:
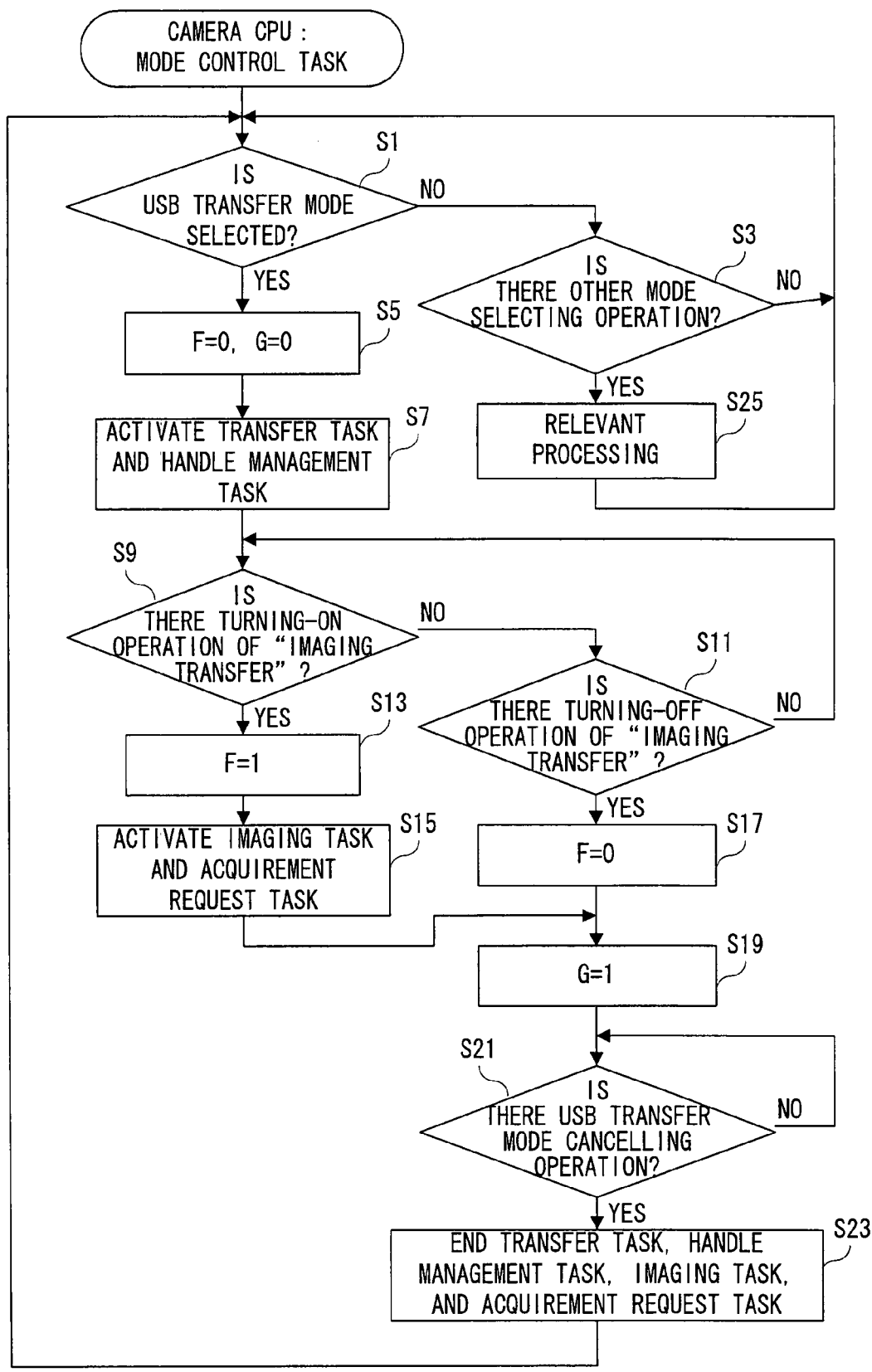
FIG. 9 is a flowchart showing a part of an operation of a CPU applied to FIG. 1 embodiment.
Figure 10:
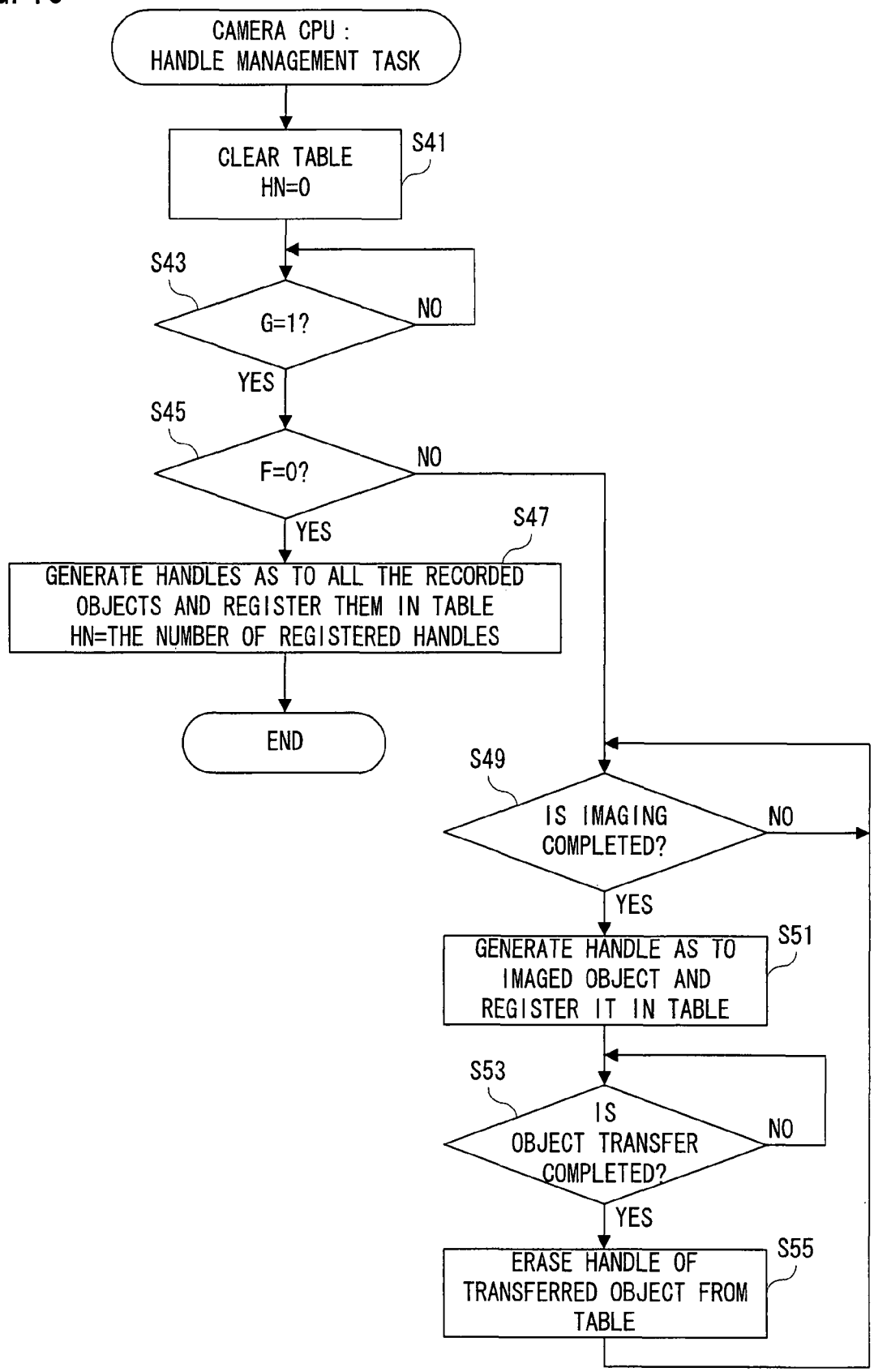
FIG. 10 is a flowchart showing another part of the operation of the CPU applied to FIG. 1 embodiment.
Figure 11:
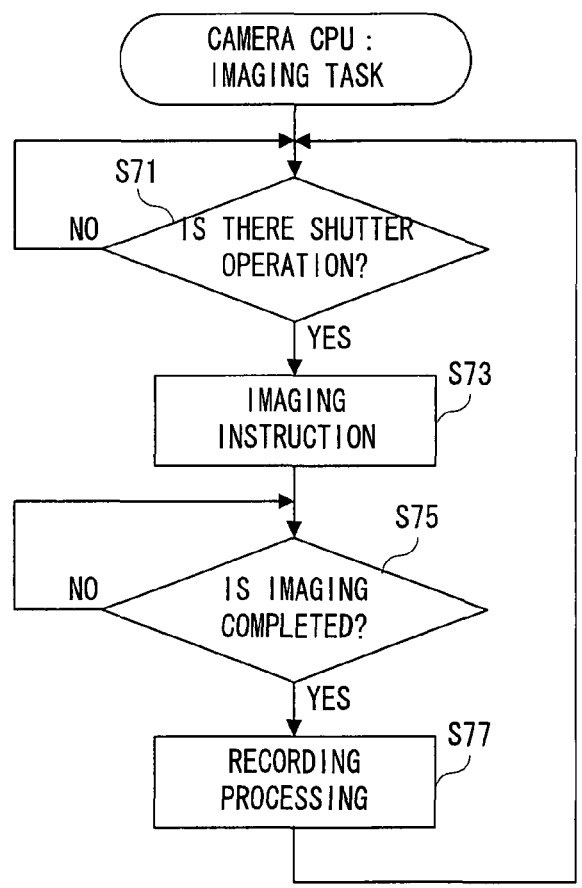
FIG. 11 is a flowchart showing still another part of the operation of the CPU applied to FIG. 1 embodiment.
Figure 12:
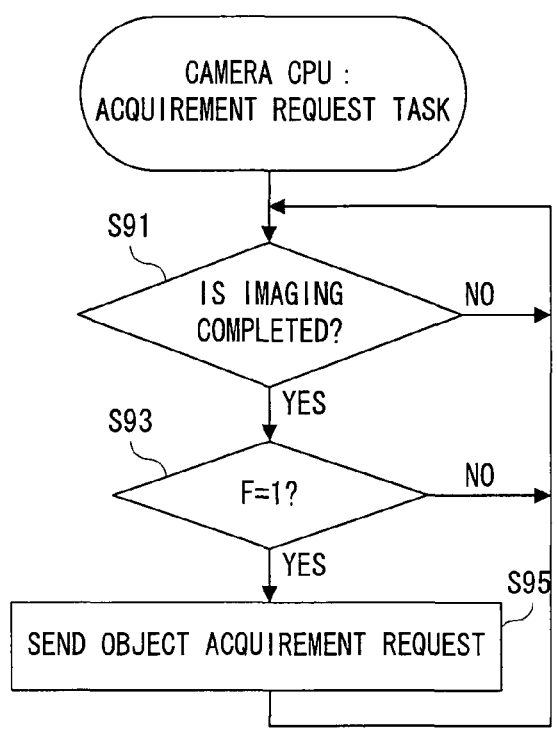
FIG. 12 is a flowchart showing a further part of the operation of the CPU applied to FIG. 1 embodiment.
Figure 13:
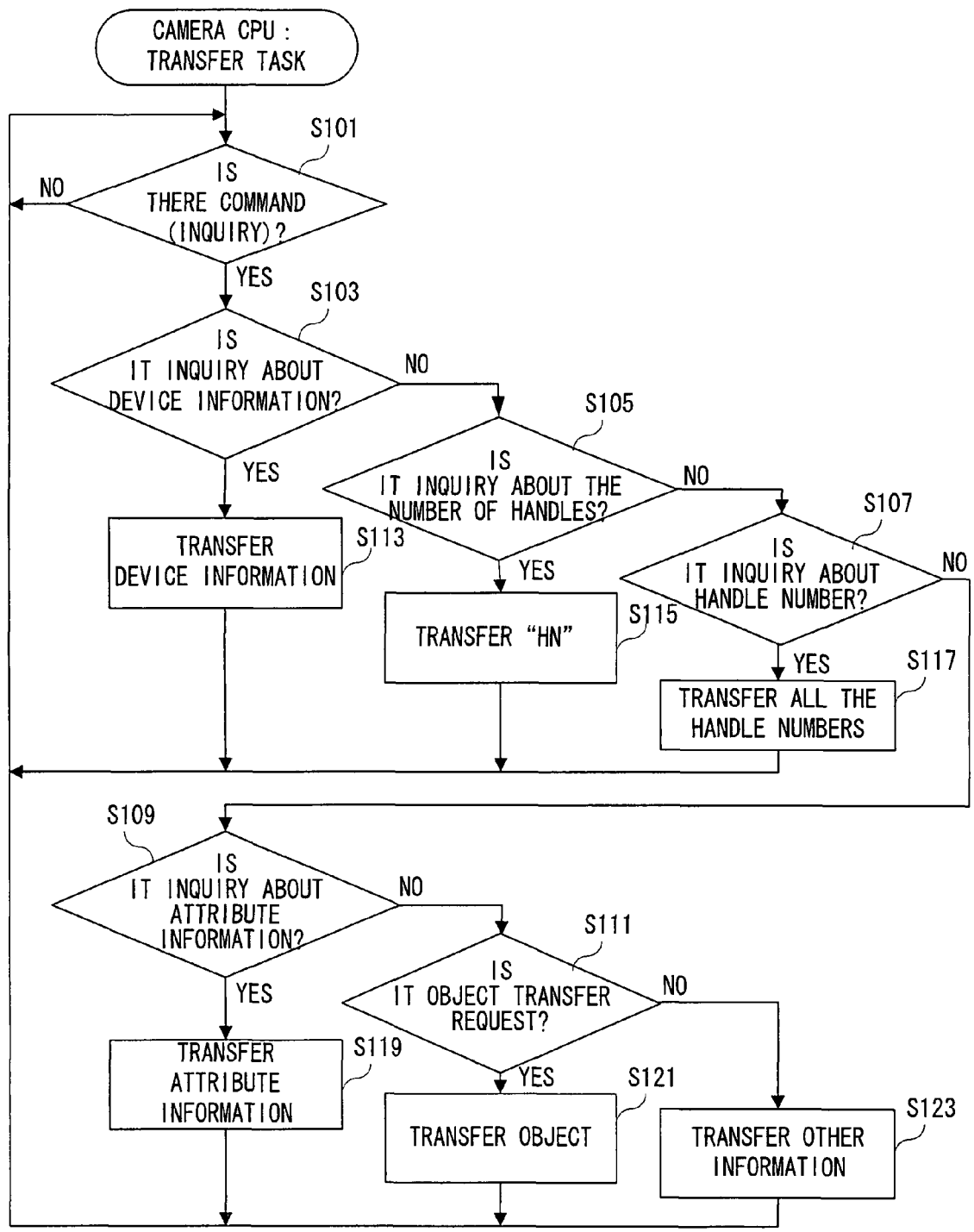
FIG. 13 is a flowchart showing a still further part of the operation of the CPU applied to FIG. 1 embodiment.

The CPU 18 of the camera 10 executes in parallel a mode control task in FIG. 9, a handle management task in FIG. 10, an imaging task in FIG. 11, an acquirement request task in FIG. 12, and a transfer task in FIG. 13 under the control of the multitasking OS such as µITRON. It should be noted that programs corresponding to the flowcharts are stored in the ROM 16.

With reference to the FIG. 9, it is determined whether or not there is a USB transfer mode selecting operation in a step S1, and it is determined whether or not there is other mode selecting operation in a step S3. Additionally, when an operation of selecting a desired mode is performed via the operation key 22, a control signal corresponding thereto is applied from the system controller 20 to the CPU 18, and the CPU 18 performs the determinations in the steps S1 and S3 on the basis of the applied control signal.

When a USB transfer mode selecting operation is performed, "YES" is determined in the step S1, and the process shifts to a step S5. When other mode selecting operation is performed, the process shifts to a step S25 from the step S3 to execute processing according to the relevant mode, and then, the process returns to the loop of the steps S1 and S3.

In the step S5, "0" is set to each of flags F and G. In a step S7, a transfer task and a handle management task are activated. In a step S9, it is determined whether or not there is a turning-on operation of the imaging transfer, and in a step S11, it is determined whether or not there is a turning-off operation of the imaging transfer. When a turning-on operation of the imaging transfer is performed, "1" is set to the flag F in a step S13, an imaging task and an acquirement request task are activated in a step S15, and then, the process proceeds to a step S19. On the other hand, when a turning-off operation of the imaging transfer is performed, "0" is set to the flag F in a step S17, and then, the process proceeds to the step S19.

In the step S19, "1" is set to the flag G. In a succeeding step S21, it is determined whether or not there is a USB transfer mode cancelling operation. If "NO" here, a standby state is held, and if "YES", the transfer task, the handle management task, the imaging task and the acquirement request task are ended in a step S23, and then, the process returns to the step S1.

With reference to FIG. 10, in a step S41, the table 26t is cleared, and "0" is set to the number of handles HN. In a step S43, it is determined whether or not the flag G is 1. If "NO" here, a standby state is held, and if "YES" is determined, the process shifts to a step S45 to further determine whether or not the flag F is "0".

If "YES" is determined in the step S45, the process shifts to a step S47 to generate handle numbers with respect to all the objects recorded in the memory card 28 (see FIG. 3), and registers the generated handle numbers and the object identifiers corresponding thereto in the table 26t (see FIG. 5). Then, the task is ended.

If "NO" in the step S45, that is, if F=1, the process shifts to a step S49 to determine whether or not imaging processing according to an imaging instruction (S73) of the imaging task is completed. If "NO" is determined in the step S49, a standby state is held while if "YES" is determined, the process shifts to a step S51. In the step S51, a handle number is generated as to an object added to the memory card 28 as a result of the imaging processing, and the generated handle number and the object identifier corresponding thereto are registered in the table 26t (see FIG. 8(A)).

In a step S53, it is determined whether or not the object transfer (S121) by the transfer task is completed, and if "NO" here, a standby state is held. If "YES" is determined in the step S53, the process shifts to a step S55 to erase the handle number and the identifier of the transferred object from the table 26t (see FIG. 8(B)). Then, the process returns to the step S49.

With reference to the FIG. 11, in a step S71, it is determined whether or not there is a shutter operation. If "NO" here, a standby state is held, and if "YES" is determined, an imaging instruction is issued in a step S73. A primary exposure is performed in response to the imaging instruction by the image sensor 12. The signal processing circuit 14 fetches all the electric charges generated by the primary exposure, that is, a raw image signal from the image sensor 12, converts the fetched raw image signal into raw image data, converts the converted raw image data into image data in YUV format, and writes the converted image data in the SDRAM 26.

In a step S75, it is determined whether or not the imaging processing is completed, and if "NO" here, a standby state is held. After completion of writing the converted image data to the SDRAM 26, "YES" is determined in the step S75, and the process shifts to a step S77. In the step S77, a recording process is executed. More specifically, the image data is read from the SDRAM 26, and an image file including the read image data is recorded in the memory card 28. Then, the process returns to the step S71.

With reference to the FIG. 12, in a step S91, it is determined whether or not the imaging processing according to the imaging instruction (S73) of the imaging task is completed. If "NO" here, a standby state is held, and if "YES" is determined, the process shifts to a step S93. In the step S93, it is determined whether or not the flag F is "1", and if "NO" here, the process returns to the step S91. If "YES" in the step S93, an object acquirement request is sent in a step S95, and then, the process returns to the step S91.

Referring to FIG. 13, in a step S101, it is determined whether or not a command or an inquiry is sent. If there is a command or an inquiry, "YES" is determined here, and the content is determined through steps S103-S111. More specifically, it is determined whether or not the content is an inquiry about the device information in the step S103, it is determined whether or not the content is an inquiry about the number of handles in the step S105, it is determined whether or not the content is an inquiry about the handle number in the step S107, it is determined whether or not the content is an inquiry about the attribute information in the step S109, and it is determined whether or not the content is a transfer request of the object in the step S111.

If "YES" is determined in the step S103, the process shifts to a step S113 to transmit the device information. If "YES" is determined in the step S105, the process shifts to a step S115 to transmit the number of handles NH. If "YES" is determined in the step S107, the process shifts to a step S117 to transmit all handle numbers on the table 26t. If "YES" is determined in the step S109, the process shifts to a step S119 to transmit the attribute information. If "YES" is determined in the step S111, the process shifts to a step S121 to transmit the object. If "NO" is determined in any of the steps S103-S111, other information is transmitted in a step S123. After the transfer, the process returns to the step S101.

As understood from the above description, in this embodiment, when a shutter operation is performed via the operation key 22, an image imaged by the image sensor 12 is captured in the SDRAM 26, and the captured image is recorded in the memory card 28. The recorded image is transferred to the recorder 40 being host equipment through the USB controller 30 when the USB transfer mode is selected, and the imaging transfer mode as a subordinate mode is turned off. That is, the CPU 18 registers all the attribute information of the recorded image in the table 26t, and the recorder 40 performs an image acquiring operation with reference to the table 26t. During that time, a shutter operation, that is, a capturing operation of an image is prohibited.

When the imaging transfer mode is turned on, registering all the attribute information is omitted, and a capturing operation of an image is allowed. The CPU 18 registers only the attribute information of the new captured image in the table 26t, and sends an image acquiring request to the recorder 40.

Thus, when the imaging transfer mode is turned on, the information amount of the attribute information to be registered in the table 26*t* is suppressed to allow a quick capturing operation of the image. Furthermore, by describing the attribute information of the new captured image in the table 26*t* and sending an image acquiring request to the recorder 40, it is possible for the recorder 40 to immediately perform an acquiring operation as to the image.

Additionally, although the digital camera 10 in this embodiment makes a PTP connection with the recorder 40 by utilizing the USB system to transfer an image to the recorder 40, a destination for transfer may be arbitrary USB host equipment such as a printer, a personal computer, etc. Also, the PTP connection can be realized via the wireless LAN (PTP/IP connection). Furthermore, an object to be transferred is an arbitrary content such as sound, programs, etc.

In addition, a digital camera 10 is explained as one embodiment in the above description. However, the present invention may be applied to any content recording apparatuses capable of capturing a content by an imager, recording the captured content, and transmitting the recorded content to host equipment. Such a content recording apparatus includes a recorder capturing sound via a microphone, recording the captured sound, and transmitting the recorded sound to other recorder, and a recorder integrated with tuner capable of capturing a broadcast content by a tuner, recording the captured broadcast content in the built-in hard disk, and transmitting the recorded broadcast content to other recorder.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content recording apparatus, comprising:
a capturer which captures a content;
a recorder which records the content captured by said capturer in a recording medium;
a management table which holds attribute information of the content recorded in said recording medium;
a connector which connects with a host device performing a content acquiring operation on the basis of said management table;
a selector which selects any one of a first mode allowing a capturing operation by said capturer in a state that a connection by said connector is established and a second mode prohibiting said capturer from performing a capturing operation in a state that a connection by said connector is established;
a suppresser which suppresses at least a portion of the attribute information held by said management table when said first mode is selected and which does not suppress said portion of the attribute information held in said management table when said second mode is selected; and
a describer which describes the attribute information of the content captured by said capturer in said first mode in said management table.

2. A content recording apparatus according to claim 1, further comprising a transmitter which transmits a content acquiring request to said host device in association with a describing operation by said describer.

3. A content recording apparatus according to claim 1, wherein said capturer includes an image sensor, said content includes image data corresponding to an object scene image imaged by said image sensor, and said connector performs a PTP connection.

4. A content recording apparatus, comprising:
a capturer which captures a content;
a recorder which records the content captured by said capturer in a recording medium;
a management table which holds attribute information of the content recorded in said recording medium;
a connector which connects with a host device performing a content acquiring operation on the basis of said management table;
a selector which selects any one of a first mode allowing a capturing operation by said capturer in a state that a connection by said connector is established and a second mode prohibiting said capturer from performing a capturing operation in a state that a connection by said connector is established;
a suppresser which suppresses at least a portion of the attribute information held by said management table when said first mode is selected and which does not suppress said portion of the attribute information held in said management table when said second mode is selected;
a describer which describes the attribute information of the content captured by said capturer in said first mode in said management table;
a determiner which determines whether or not a content acquiring operation is performed on the content captured by said capturer in said first mode; and
an erasure which erases the attribute information described by said describer from said management table when a determination result by said determiner is affirmative.

5. A content recording apparatus having a capturer which captures a content, a recorder which records the content captured by said capturer in a recording medium, a management table which holds attribute information of the content recorded in said recording medium, a connector which connects with a host device performing a content acquiring operation on the basis of said management table, the content recording apparatus further comprising:
a processor;
a memory operatively linked to the processor; and
a capture control application program stored in the memory and executed by the processor, wherein the executed capture control application program performs steps comprising:
a selecting step for selecting any one of a first mode allowing a capturing operation by said capturer in a state that a connection by said connector is established and a second mode prohibiting said capturer from performing a capturing operation in a state that a connection by said connector is established;
a suppressing step for suppressing at least a portion of the attribute information held by said management table when said first mode is selected and not suppressing said portion of the attribute information held in said management table when said second mode is selected; and
a describing step for describing the attribute information of the content captured by said capturer in said first mode in said management table.

6. A non-transitory recording medium having stored therein a capture control application program, said capture control application program causes a processor of a content recording apparatus having a capturer which captures a content, a recorder which records the content captured by said capturer in the non-transitory recording medium, a management table which holds attribute information of the content recorded in said non-transitory recording medium, and a connector which connects with a host device performing a content acquiring operation on the basis of said management table to execute the capture control application program stored in the non-transitory recording medium, wherein the executed capture control application program performs steps comprising:

a selecting step for selecting any one of a first mode allowing a capturing operation by said capturer in a state that a connection by said connector is established and a second mode prohibiting said capturer from performing a capturing operation in a state that a connection by said connector is established;

a suppressing step for suppressing at least a portion of the attribute information held by said management table when said first mode is selected and not suppressing said portion of the attribute information held in said management table when said second mode is selected; and a describing step for describing the attribute information of the content captured by said capturer in said first mode in said management table.

7. A capture controlling method executed by a content recording apparatus having a capturer which captures a content, a recorder which records the content captured by said capturer in a recording medium, a management table which holds attribute information of the content recorded in said recording medium, a connector which connects with a host device performing a content acquiring operation on the basis of said management table, comprising:

a selecting step for selecting any one of a first mode allowing a capturing operation by said capturer in a state that a connection by said connector is established and a second mode prohibiting said capturer from performing a capturing operation in a state that a connection by said connector is established;

a suppressing step for suppressing at least a portion of the attribute information held by said management table when said first mode is selected and not suppressing said portion of the attribute information held in said management table when said second mode is selected; and a describing step for describing the attribute information of the content captured by said capturer in said first mode in said management table.

\* \* \* \* \*